(12) United States Patent
Wang

(10) Patent No.: US 11,768,793 B2
(45) Date of Patent: Sep. 26, 2023

(54) PLUG-IN MOBILE PERIPHERAL COMPONENT INTERCONNECT EXPRESS MODULE CONNECTOR

(71) Applicant: Dun-Pu Electronics Co. Ltd., New Taipei (TW)

(72) Inventor: Huang-Wen Wang, New Taipei (TW)

(73) Assignee: DUN-PU ELECTRONICS CO. LTD., New Taipei (TW)

( * ) Notice: Subject to any disclaimer, the term of this patent is extended or adjusted under 35 U.S.C. 154(b) by 342 days.

(21) Appl. No.: 17/327,564

(22) Filed: May 21, 2021

(65) Prior Publication Data
US 2022/0374380 A1 Nov. 24, 2022

(51) Int. Cl.
*G06F 13/00* (2006.01)
*G06F 13/40* (2006.01)
*G06F 1/18* (2006.01)
*H01R 12/71* (2011.01)

(52) U.S. Cl.
CPC .......... *G06F 13/4068* (2013.01); *G06F 1/183* (2013.01); *G06F 13/409* (2013.01); *H01R 12/716* (2013.01); *G06F 13/00* (2013.01); *G06F 2213/0024* (2013.01); *G06F 2213/0026* (2013.01)

(58) Field of Classification Search
CPC ........ G06F 1/183; G06F 1/185; G06F 13/409; G06F 1/186; G06F 1/187; H01R 12/59; H01R 12/7076
See application file for complete search history.

(56) References Cited

U.S. PATENT DOCUMENTS

| | | | |
|---|---|---|---|
| 7,261,591 B2 * | 8/2007 | Korsunsky | H01R 12/727 439/541 |
| 11,392,530 B2 * | 7/2022 | Chih | G06F 1/189 |
| 2017/0215296 A1 * | 7/2017 | Tsai | H01R 12/716 |

\* cited by examiner

*Primary Examiner* — Tammara R Peyton
(74) *Attorney, Agent, or Firm* — Muncy, Geissler, Olds & Lowe, P.C.

(57) ABSTRACT

A plug-in mobile peripheral component interconnect express module connector is disclosed, comprising a plastic body, and a first terminal set and a second terminal set disposed relatively in the plastic body. The plastic body includes transversely penetrated slots, an upper end surface of the slots has intermittently plural upper magazines, and a lower end surface has intermittently plural lower magazines. The first terminal set includes plural first elastic terminals inserted in the upper magazines, and the second terminal set includes plural second elastic terminals inserted in the lower magazines. Each first elastic terminal is opposed to each second elastic terminal, forming a holding gap. A motherboard is inserted between the first elastic terminals and the second elastic terminals from a side, and an MXM board is inserted between the first elastic terminals and the second elastic terminals from the other side.

6 Claims, 13 Drawing Sheets

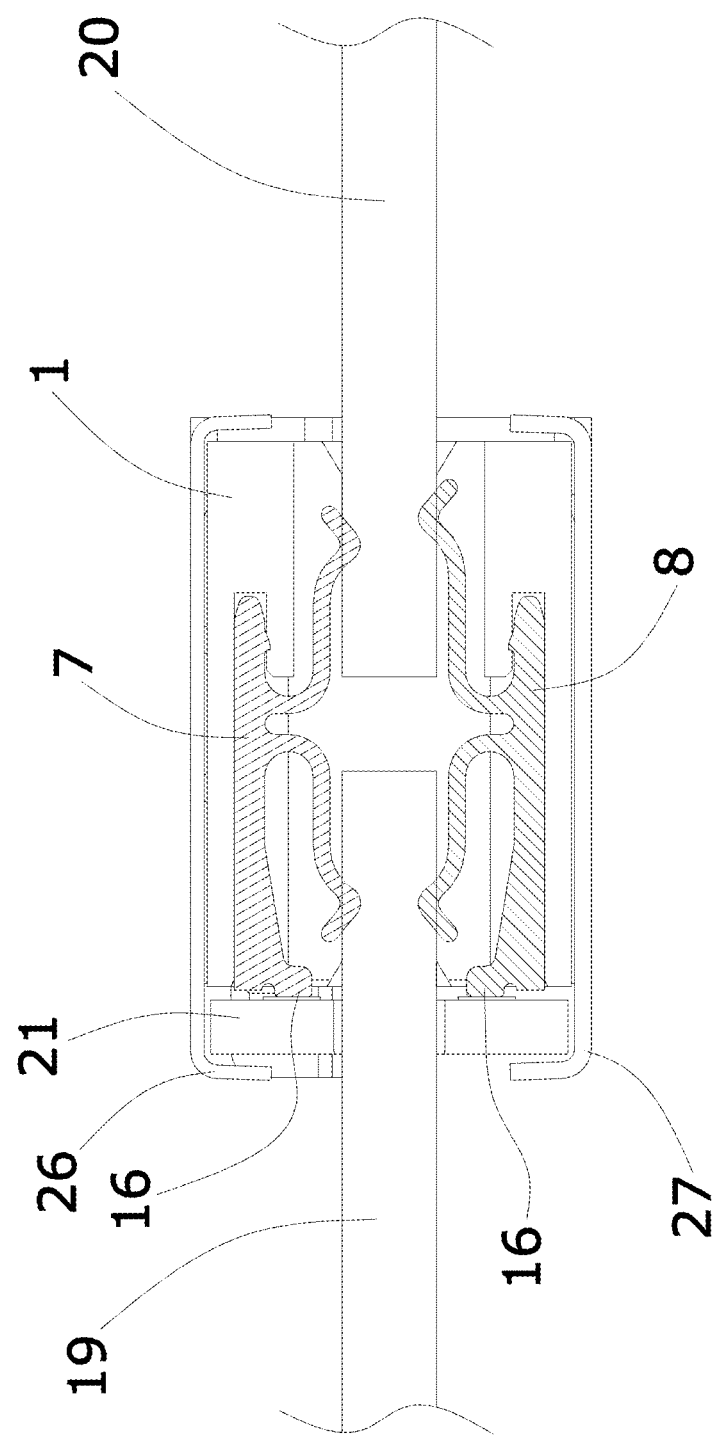

PLUG-IN MOBILE PERIPHERAL COMPONENT INTERCONNECT EXPRESS MODULE CONNECTOR

BACKGROUND OF THE INVENTION a) Field of the Invention

The present invention relates to an electrical connector, and more particularly to a plug-in MXM (Mobile Peripheral Component Interconnect Express Module) connector.

b) Description of the Prior Art

A mobile PCI (Peripheral Component Interconnect) express module interface (or an MXM interface in short hereinafter) is an interface based upon the PCI express module. The MXM interface is normally used to connect a graphics processor or a video card.

An existing MXM connector is fixed to a motherboard by welding, and is fixed to an MXM board by plugging. This form of assembling needs a large quantity of work, and the requirement to welding is high. If the welding is not complete, the connection may not be stable. In addition, this kind of welding will form an integral unit to the connector and the motherboard that it will be cumbersome in post-maintenance or the entire unit has to be replaced, which increases user cost.

SUMMARY OF THE INVENTION

To cope with the lack and insufficiency of existing technology, the present invention provides a plug-in MXM connector, wherein the motherboard and the MXM board are fixed by plugging, and by the provision of a fastener, the motherboard and the connector are assembled fixedly, thereby improving the convenience in assembling and the flexibility in post-replacement.

The aforementioned technical purpose of present invention is implemented through the following technical means.

The present invention discloses a plug-in MXM connector, comprising a plastic body, and a first terminal set and a second terminal set which are disposed relatively in the plastic body. The said plastic body is provided with slots which are penetrated transversely, an upper end surface of the slots is provided intermittently with plural upper magazines, and a lower end surface of the slots is provided intermittently with plural lower magazines. The said first terminal set includes plural first elastic terminals which are inserted in the upper magazines, and the said second terminal set includes plural second elastic terminals which are inserted in the lower magazines. Furthermore, each one of the first elastic terminals is opposed to each one of the second elastic terminals, forming a holding gap between the two terminals. The motherboard is inserted between the first elastic terminals and the second elastic terminals from a side, whereas the MXM board is inserted between the first elastic terminals and the second elastic terminals from the other side.

Preferably, two sides of the plastic body are extended respectively with a fixed portion, and the fixed portion is provided with a mounting slot for inserting the motherboard, on corresponding to a side from which the motherboard is inserted. Furthermore, the fixed portion is provided with a threaded hole, allowing the motherboard to be fixed on the plastic body by fitting with a fastener.

Preferably, the entire body of the first elastic terminal and second elastic terminal is a plate structure, including a transversal base. A first elastic arm and a second elastic arm are extended from the transversal base. In addition, the free end of the first elastic arm and second elastic arm is a V-shaped contact.

Preferably, two sides on an end of the transversal base are provided with protruded blocking parts, whereas a lower section on the other end of the transversal base is provided with blocking points in an oblique triangular shape.

Preferably, the plastic body is provided with a positioning PCB (Printed Circuit Board) with an electromagnetic interference protective circuit, corresponding to a side from which the motherboard is inserted. The transversal base of the first elastic terminal and second elastic terminal is extended downward with a conductive part, and the positioning PCB is provided with PCB conductive contact sheets opposed to the conductive part. On the other hand, a center of the positioning PCB is opened with a jack for inserting the motherboard; whereas, the PCB conductive contact sheets are connected to the electromagnetic interference protective circuit on the positioning PCB.

Preferably, the plastic body is enclosed in an iron housing. The iron housing includes an upper housing and a lower housing which are clasped with each other. An edge of the said upper housing, corresponding to a side from which the motherboard is inserted, is extended with a bended connection strap; whereas, the positioning PCB is provided with a conducting plate, on a location corresponding to the connection strap. Moreover, an end of the connection strap is tightly attached to the conducting plate on the positioning PCB, and the conducting plate is connected to one or plural PCB conductive contact sheets.

The plug-in MXM connector disclosed by the present invention is provided with following benefits:

1. The elastic terminals in a special structure are used, so that the motherboard and the MXM board are assembled by plug-and-pull, thereby improving the convenience in assembling and avoiding the issue of connection due to bad welding.
2. The fixed portion on two sides of the plastic body, in association with the fastener, allows the plastic body to be assembled with the motherboard fixedly, which prevents the connector from separating with the motherboard.
3. The iron housing on the exterior of the plastic body can achieve the function of anti-electromagnetic interference. By connecting the iron housing to the protective circuit on the positioning PCB, the anti-electromagnetic interference function to a CPU (Central Processing Unit) on the motherboard can be intensified.

To enable a further understanding of the said objectives and the technological methods of the invention herein, the brief description of the drawings below is followed by the detailed description of the preferred embodiments.

BRIEF DESCRIPTION OF THE DRAWINGS

FIG. 13 shows a side cutaway view when the second embodiment of the present invention is in use.

DETAILED DESCRIPTION OF THE PREFERRED EMBODIMENTS

Figure 1:
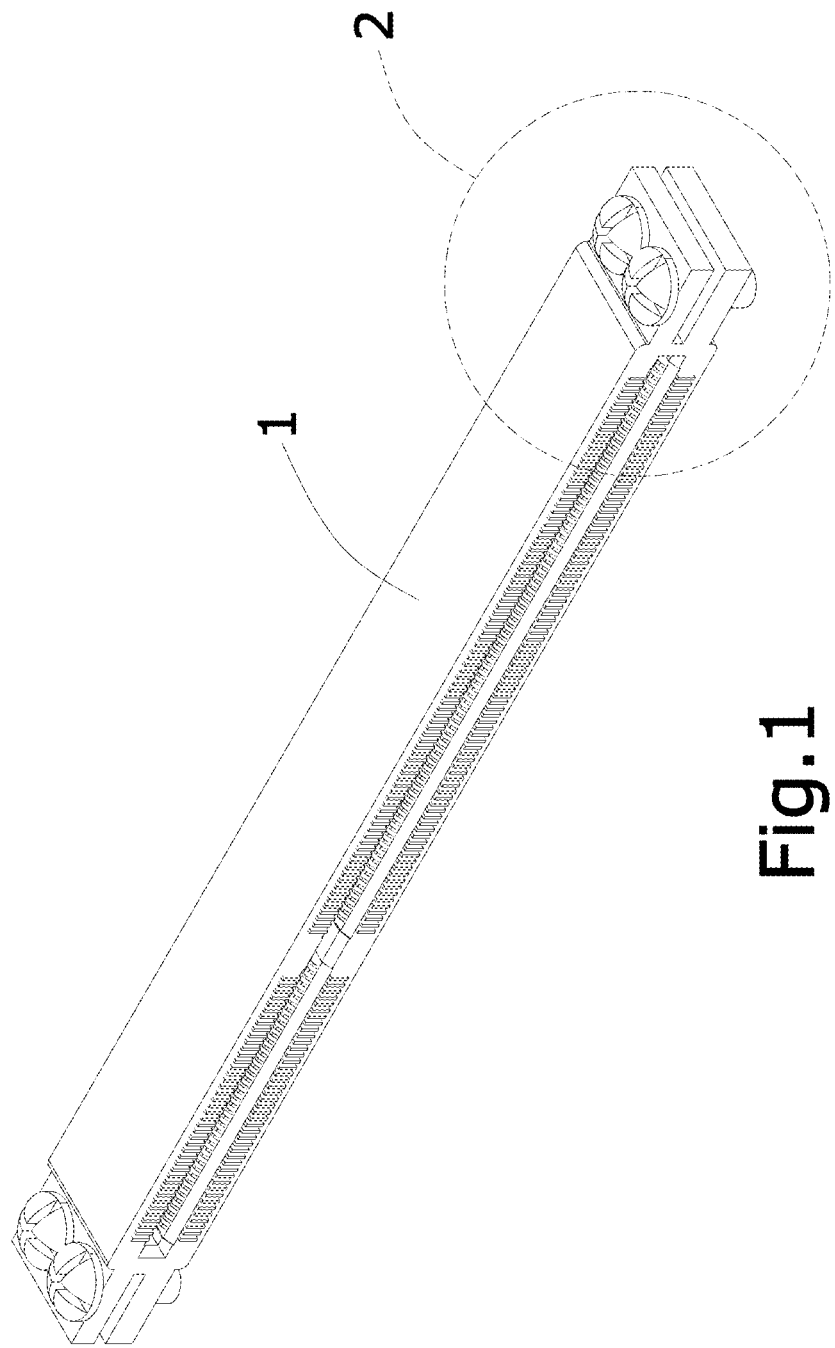
FIG. 1 shows a structural schematic view of a first embodiment of the present invention.
Figure 2:
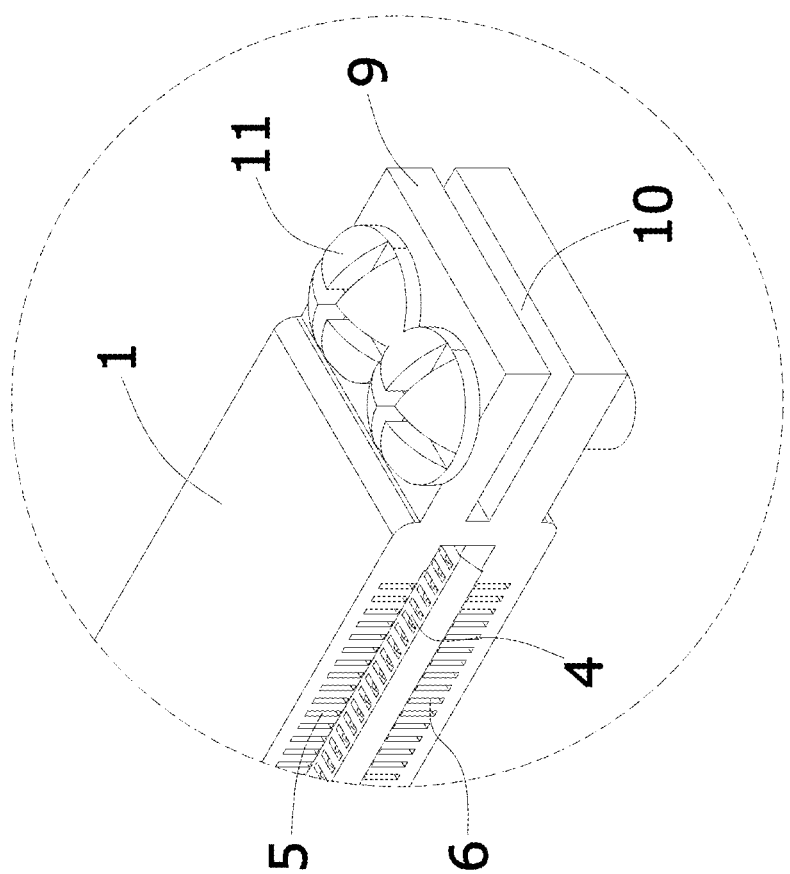
FIG. 2 shows a local enlarged diagram in FIG. 1.
Figure 3:
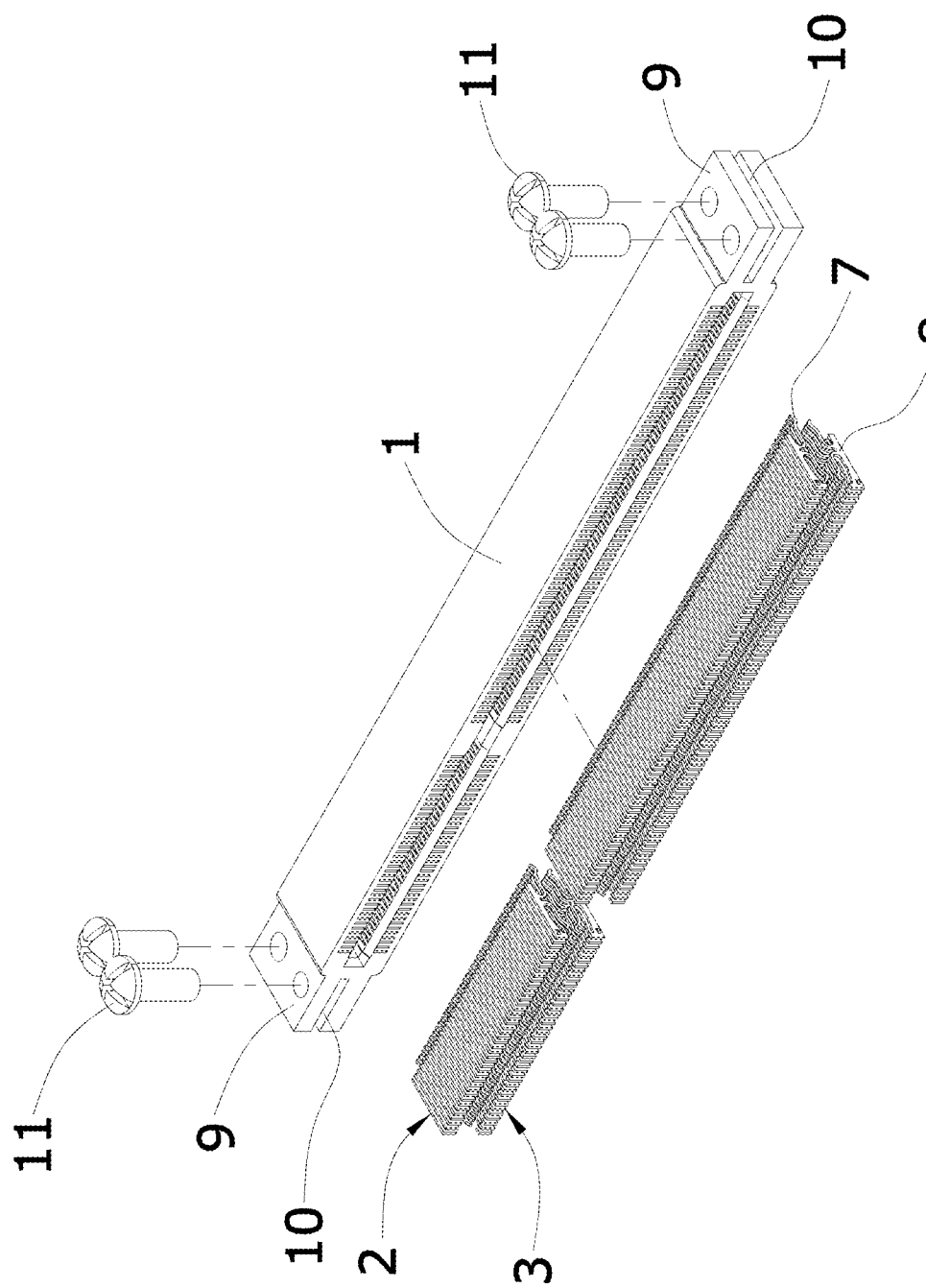
FIG. 3 shows an exploded view of the first embodiment of the present invention.

The present invention discloses a plug-in MXM connector which is used to connect a motherboard and an MXM board, wherein a side of the plug-in MXM connector is fixed on the motherboard and the other side of the plug-in MXM connector is inserted with the MXM board. Referring to FIGS. 1 to 3 for the specific structures, the plug-in MXM connector comprises a plastic body 1, and a first terminal set 2 and a second terminal set 3 which are disposed relatively in the plastic body 1. The said plastic body 1 is provided with slots 4 which are penetrated transversely, for the insertion of the motherboard and the MXM board, respectively. An upper end surface of the said slots 4 is provided intermittently with plural upper magazines 5, and a lower end surface of the said slots 4 is provided intermittently with plural lower magazines 6. The said first terminal set 2 includes plural first elastic terminals 7 which are inserted in the upper magazines 5, and the said second terminal set 3 includes plural second elastic terminals 8 which are inserted in the lower magazines 6. In addition, the first elastic terminal 7 is opposite to the second elastic terminal 8, forming a holding gap. The motherboard is inserted from a side into the holding gap between the first elastic terminal 7 and the second elastic terminal 8; whereas, the MXM board is inserted from the other side into the holding gap between the first elastic terminal 7 and the second elastic terminal 8, so that the motherboard and the MXM board are all connected by plug-and-pull.

For a simple plug-and-pull structure, the connector will be separated from the motherboard while plugging and pulling the MXM board; however, this is not permitted. Therefore, two sides of the plastic body 1 are extended respectively with a fixed portion 9. The fixed portion 9 is provided with a mounting slot 10 corresponding to a side from which the motherboard is inserted. In addition, the fixed portion 9 is provided with a vertically transfixed threaded hole, the motherboard is inserted into the said mounting slot 10, and the motherboard and the connector are assembled fixedly by screwing a fastener 11 into the threaded hole and a riveting hole on the motherboard. This kind of plug-and-pull structure in association with the fastener 11 will not result in the separation of the connector from the motherboard by plugging and pulling the MXM board, in a real application.

Figure 4:
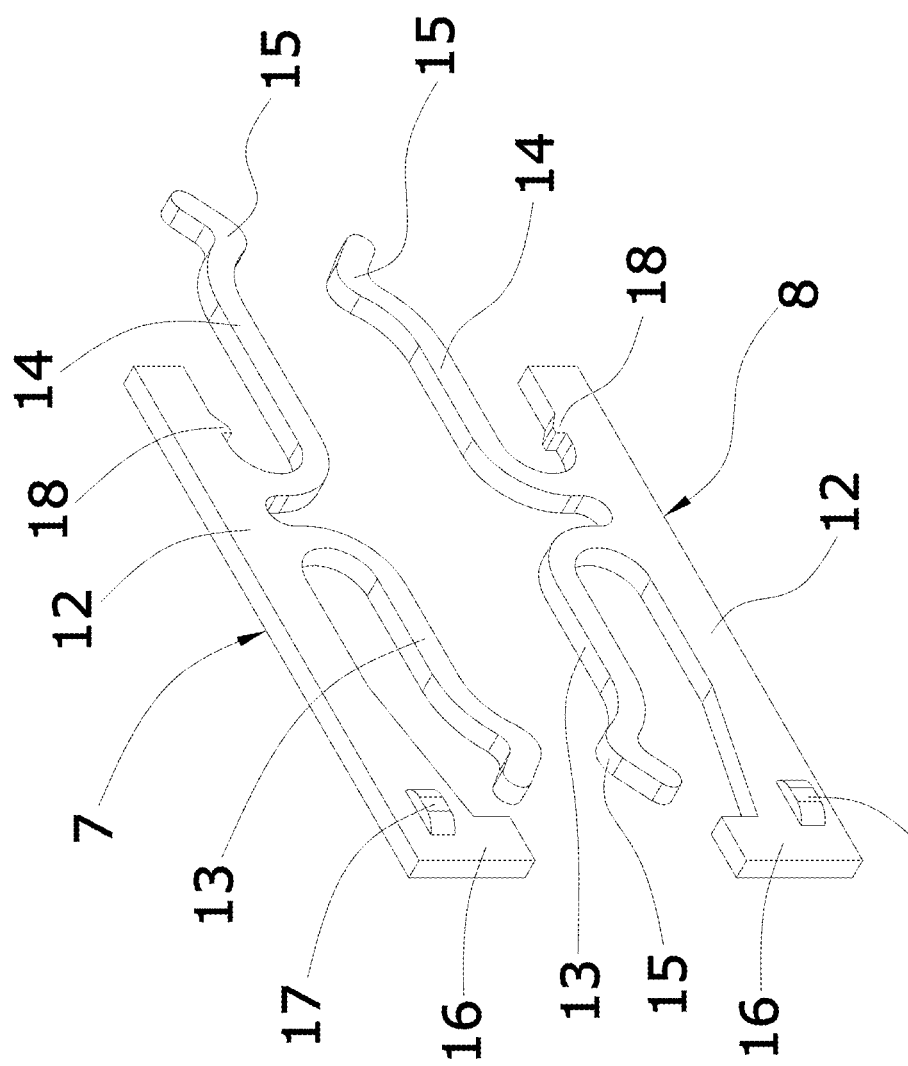
FIG. 4 shows a structural diagram of a first elastic terminal and a second elastic terminal in the first embodiment of the present invention.

As shown in FIG. 4, the structure of the said first elastic terminal 7 is the same as that of the second elastic terminal 8. The terminals are symmetric vertically and the entire unit is a plate structure, with a transversal base 12. A lower side of the transversal base 12 is symmetrically left to right with a first elastic arm 13 and a second elastic arm 14. A free end of the said first elastic arm 13 and second elastic arm 14 is a V-shaped contact 15, and an end of the said transversal base 12 is extended downward and vertically with a conductive part 16. Furthermore, two sides of that end are provided with a protruded blocking part 17. The provision of the blocking parts 17 is able to prevent the elastic terminals from displacing upon being inserted into the magazines (an inner wall of the magazine is also provided with an indented blocking part which is not shown in the drawing). A lower section on the other end of the said transversal base 12 is provided with blocking points 18 in an oblique triangular shape. The provision of blocking points 18 can increase the retentivity between the first elastic terminal 7, the second elastic terminal 8 and the plastic body 1, thereby preventing the loose of elastic terminals while plugging and pulling the MXM board.

In using the plug-in MXM connector, the motherboard is inserted into a side of the first elastic arms 13, and conductive points on the surface of motherboard are in touch with the V-shaped contacts 15 of the first elastic arms 13; whereas, the MXM board is inserted into a side of the second elastic arms 14, and conductive points on the surface of MXM board are in touch with the V-shaped contacts 15 of the second elastic arms 14.

Figure 5:
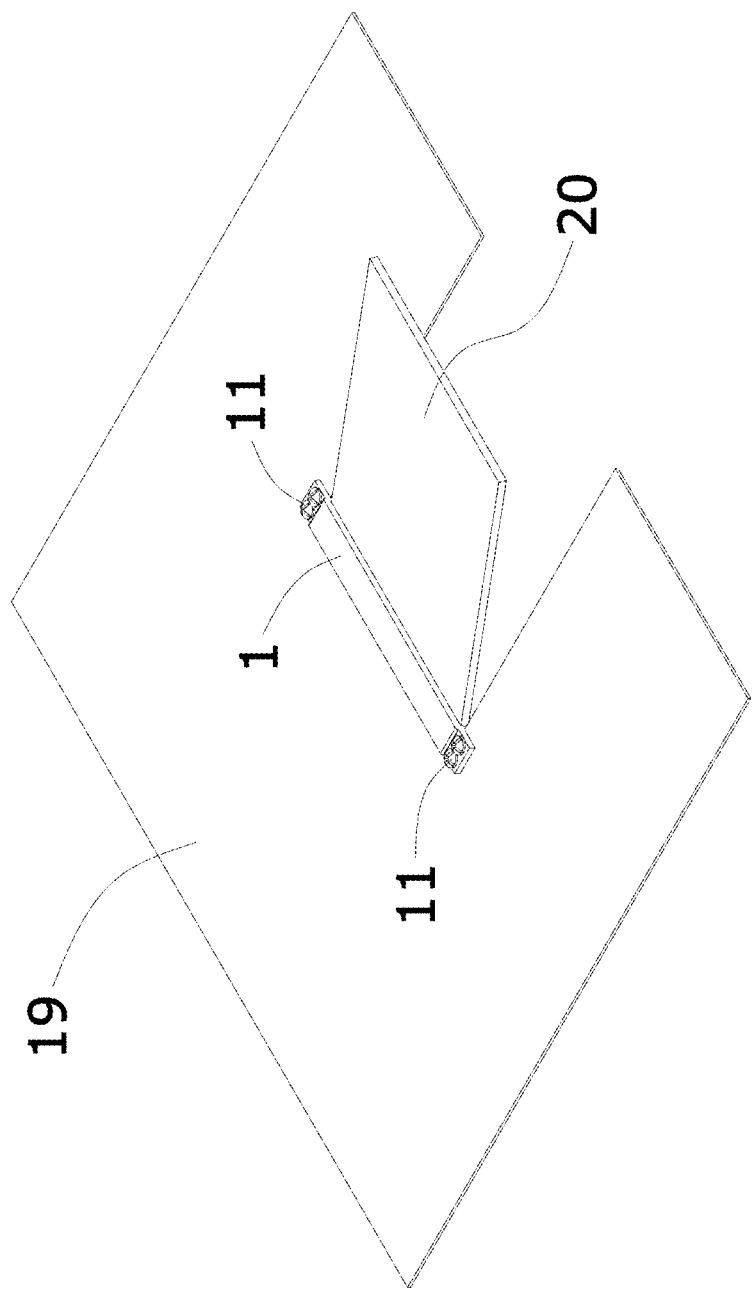
FIG. 5 shows a state diagram when an MXM board of the first embodiment is inserted.
Figure 6:
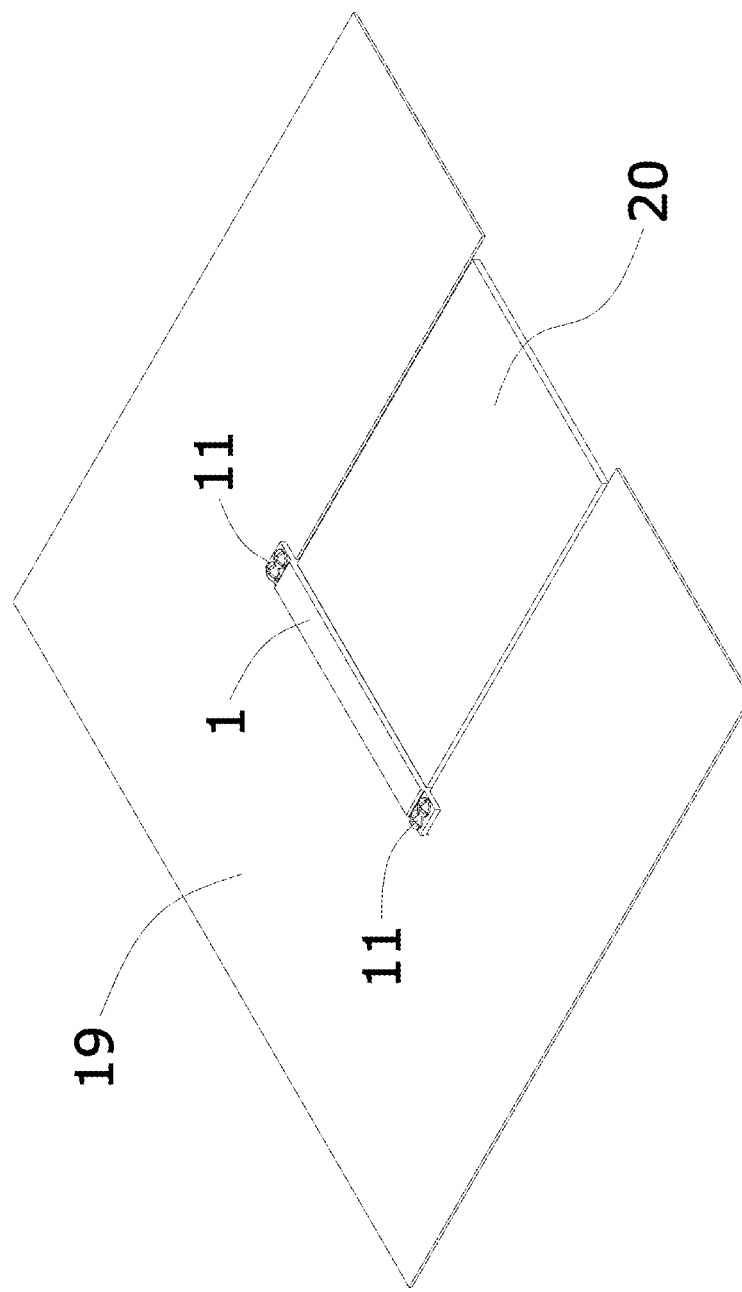
FIG. 6 shows a state diagram of use of the first embodiment of the present invention.
Figure 7:
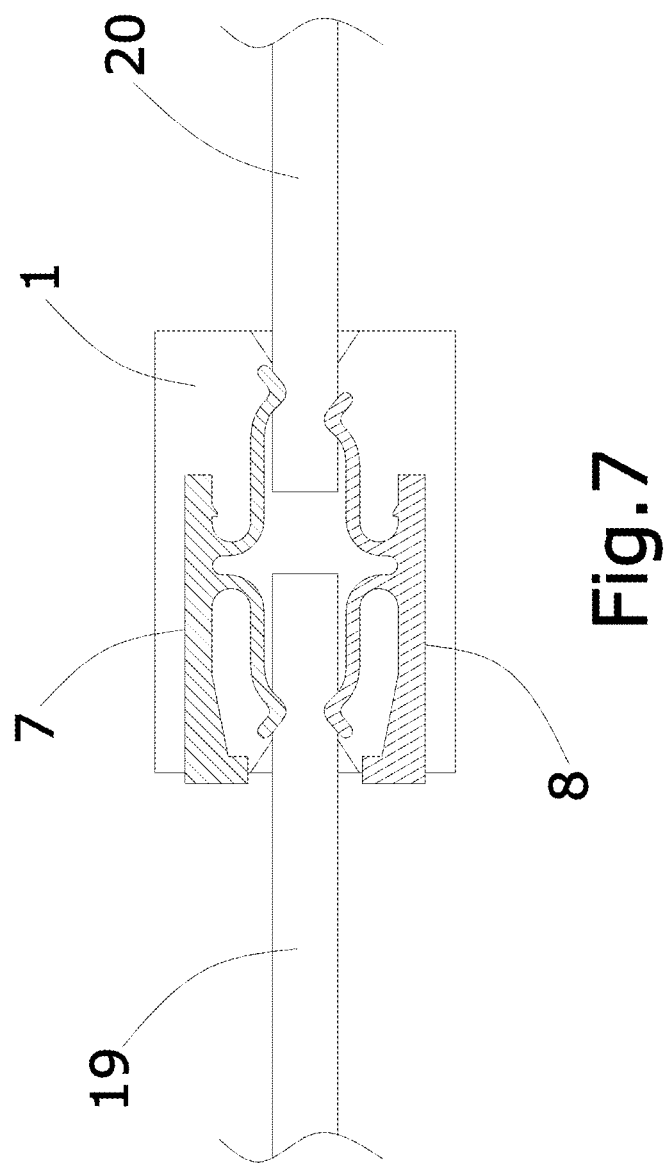
FIG. 7 shows a side cutaway view when the first embodiment of the present invention is in use.
Figure 8:
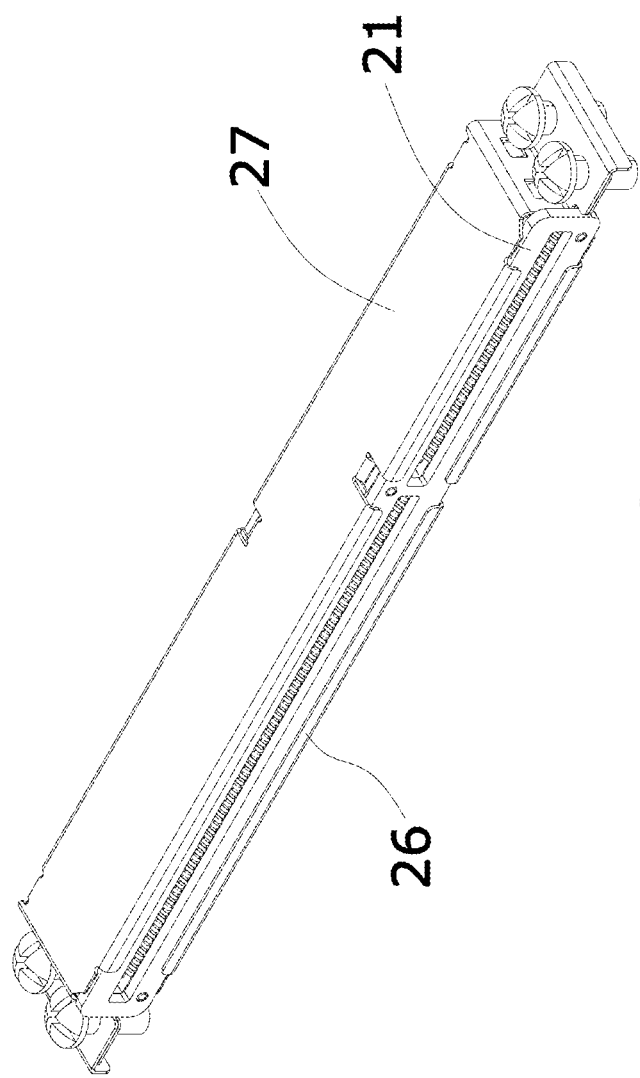
FIG. 8 shows a structural view of a second embodiment of the present invention.
Figure 9:
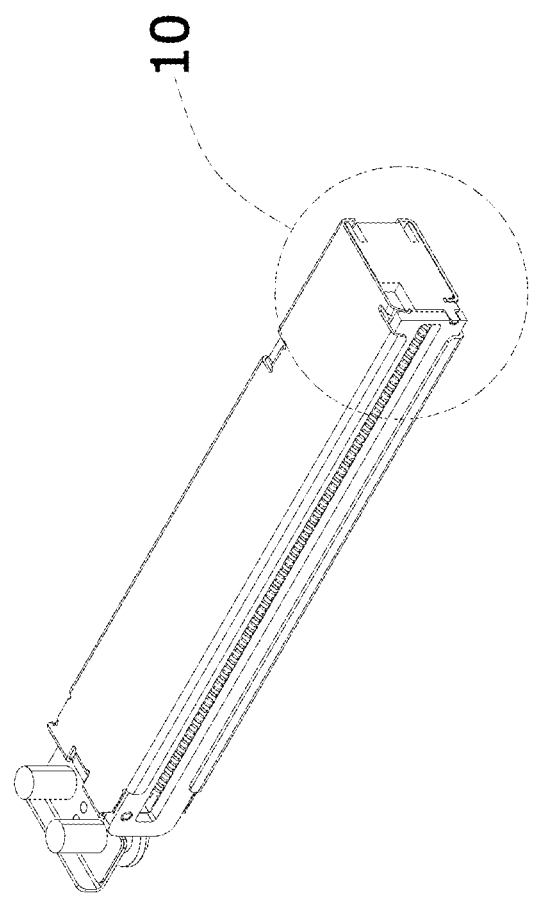
FIG. 9 shows a local cutaway view of FIG. 8.
Figure 10:
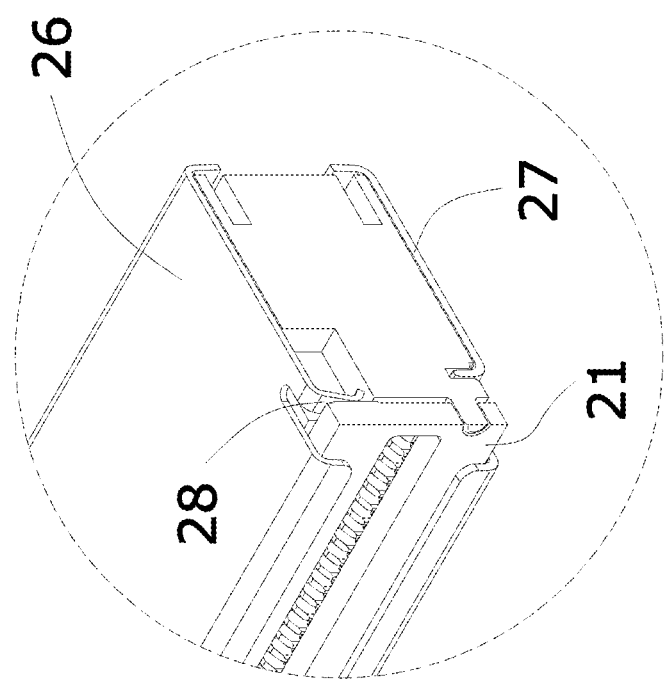
FIG. 10 shows a local enlarged view in FIG. 9.
Figure 11:
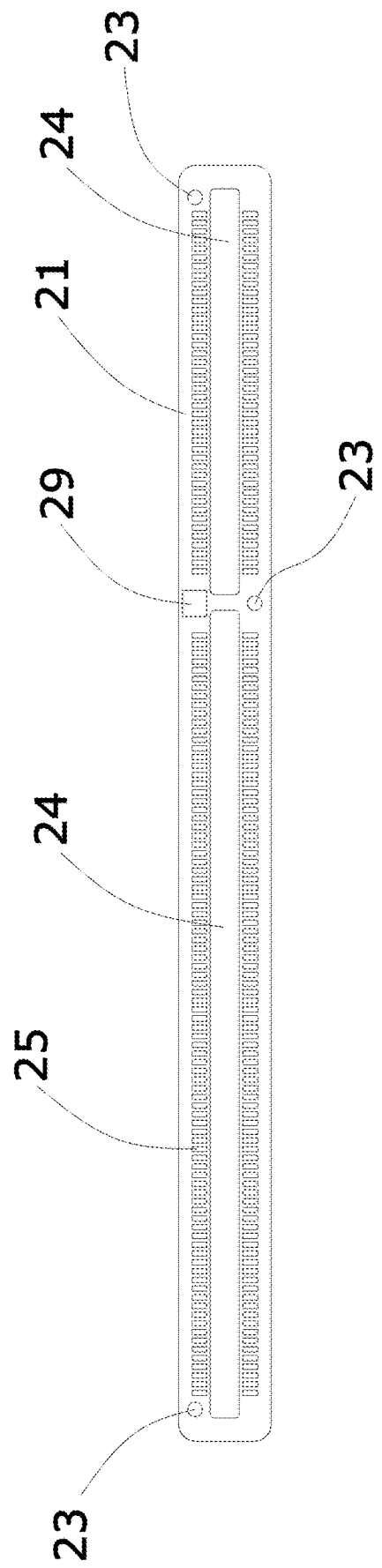
FIG. 11 shows a structural view of a positioning PCB of the present invention.

Referring to FIGS. 5 to 7 for the assembling of MXM connector in the present embodiment, a motherboard 19 is inserted from one side into the MXM connector, and is assembled fixedly through the fastener 11. An MXM board 20 is inserted from the other side at a certain included angle with respect to horizontal level, which ensures that the MXM board 20 can be inserted successfully and can touch reliably with the first elastic terminals 7 and the second elastic terminals 8. The MXM board 20 is parallel to the motherboard 19 after insertion.

Referring to FIGS. 8 to 13 for a second embodiment, a protective circuit and an anti-electromagnetic interference structure are added to the first embodiment. Specifically, the plastic body 1 is provided with a positioning PCB 21 corresponding to a side from which the motherboard 19 is inserted. To implement the positioning and fixing to the positioning PCB 21, a surface of the plastic body 1 is provided with protruded positioning pillars 22, and the positioning PCB 21 is provided with positioning holes 23 on corresponding locations. The said positioning PCB 21 is provided with an electromagnetic interference protective circuit which is a normal electromagnetic interference protective circuit. The schematic diagram of the protective circuit can refer to an existing electromagnetic interference protective circuit. In addition, a center of the positioning PCB 21 is opened with a jack 24 for inserting the motherboard 19; whereas, an upper and lower side is provided with PCB conductive contact sheets 25 on locations corresponding to the conductive parts 16 of the first elastic terminal 7 and the second elastic terminal 8. These PCB conductive contact sheets 25 are all connected electrically with the electromagnetic interference protective circuit. Moreover, after assembling, the conductive parts 16 of the first elastic terminal 7 and the second elastic terminal 8 are abutted at and fixed to the PCB conductive contact sheets 25 on the positioning PCB 21, thereby connecting with the protective circuit. The said plastic body 1 is also enclosed in an iron housing which is used to resist electromagnetic interference. The iron housing includes an upper housing 26 and a lower housing 27 which are clasped with each other. An edge of the upper housing 26, corresponding to the side from which the motherboard 19 is inserted, is extended with a bended connection strap 28. The connection strap 28 is tightly attached to a conducting plate 29 on the positioning PCB 21, and the conducting plate 29 is connected with one or plural PCB conductive contact sheets 25, thereby connecting the iron housing with the protective circuit on the positioning PCB 21, so as to intensify the anti-electromagnetic interference function of the CPU on the motherboard and reduce the number of pins required on the motherboard end.

Figure 12:
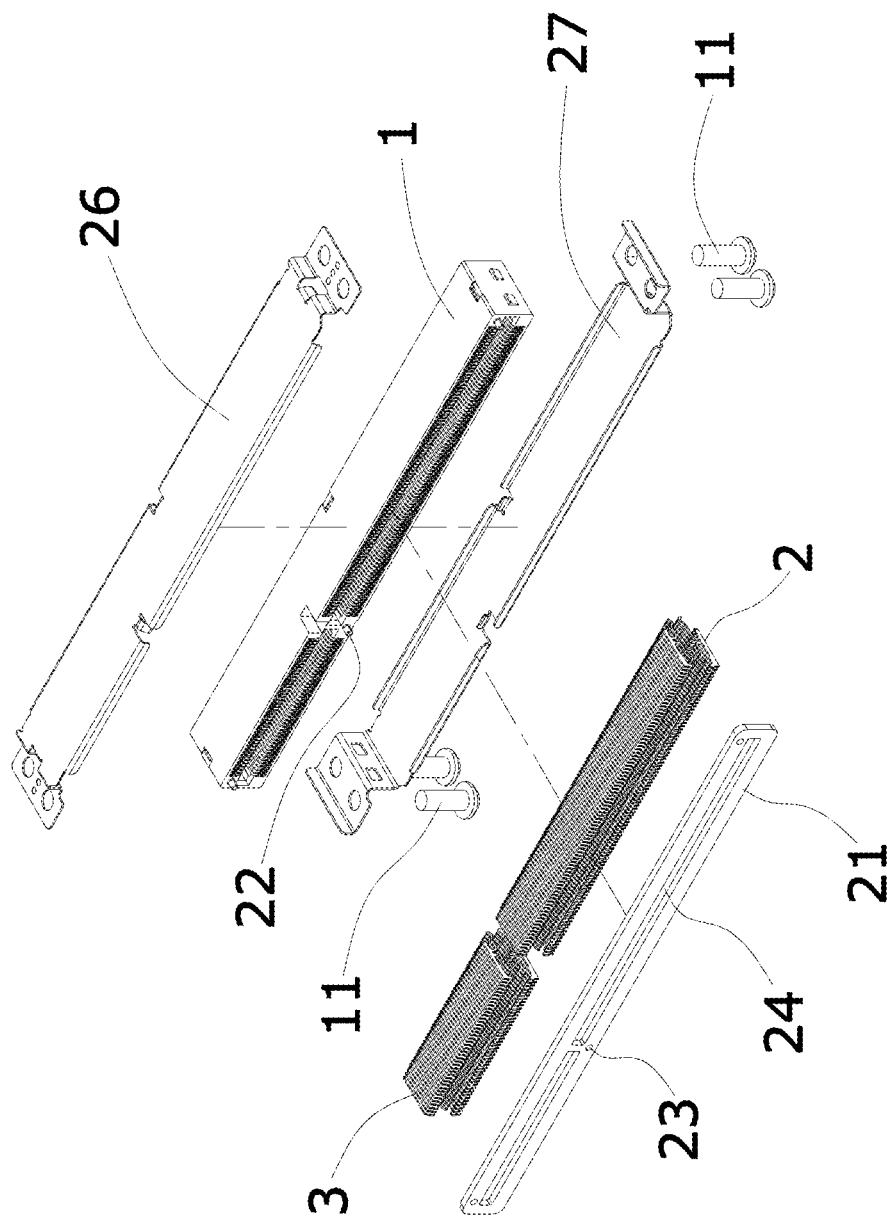
FIG. 12 shows an exploded view of the second embodiment of the present invention.

The type of assembling of the connector in the embodiment is the same as that in the first embodiment. Specifically, as shown in FIG. 12, the motherboard 19 is inserted from a side into the MXM connector, and the MXM board is inserted from the other side. The insertion of MXM board is the same as that of the first embodiment.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A plug-in mobile peripheral component interconnect express module connector, comprising a plastic body, and a first terminal set and a second terminal set which are disposed relatively in the plastic body, wherein the plastic body is provided with slots which are penetrated transversely, an upper end surface of the slots is provided intermittently with plural upper magazines, a lower end surface of the slots is provided intermittently with plural lower magazines, the first terminal set includes plural first elastic terminals which are inserted in the upper magazines, the second terminal set includes plural second elastic terminals which are inserted in the lower magazines, two ends of the first elastic terminal and the second elastic terminal are provided respectively with a first elastic arm and a second elastic arm, and the first elastic arm is disposed opposingly to the second elastic arm to form a holding gap, with a motherboard being inserted between the first elastic arms, and an MXM (Mobile Peripheral Component Interconnect Express Module) board being inserted between the second elastic arms.

2. The plug-in mobile peripheral component interconnect express module connector according to claim 1, wherein two sides of the plastic body are extended respectively with a fixed portion, the fixed portion is provided with a mounting slot for inserting a motherboard corresponding to a side from which the motherboard is inserted, the fixed portion is provided with a threaded hole, and a fastener is used in association with the threaded hole to fix the motherboard on the plastic body.

3. The plug-in mobile peripheral component interconnect express module connector according to claim 1, wherein the entire unit of the first elastic terminal and second elastic terminal is a plate structure and includes a transversal base, the first elastic arm and the second elastic arm are extended from the transversal base, and a free end of the first elastic arm and second elastic arm is a V-shaped contact.

4. The plug-in mobile peripheral component interconnect express module connector according to claim 3, wherein two sides of an end of the transversal base are provided with protruded blocking parts, and a lower section on the other end of the transversal base is provided with blocking points in an oblique triangular shape.

5. The plug-in mobile peripheral component interconnect express module connector according to claim 3, wherein the plastic body is provided with a positioning PCB (Printed Circuit Board) with an electromagnetic interference protective circuit corresponding to a side from which the motherboard is inserted, the transversal base of the first elastic terminal and second elastic terminal is extended downward with a conductive part, the positioning PCB is provided with PCB conductive contact sheets opposite to the conductive part, a center of the positioning PCB is opened with a jack for inserting the motherboard, and the PCB conductive contact sheets are connected to the electromagnetic interference protective circuit on the positioning PCB.

6. The plug-in mobile peripheral component interconnect express module connector according to claim 5, wherein the plastic body is enclosed in an iron housing, the iron housing includes an upper housing and a lower housing which are clasped with each other, an edge of the upper housing corresponding to a side from which the motherboard is inserted is extended with a bended connection strap, the positioning PCB is provided with a conducting plate corresponding to the connection strap, an end of the connection strap is tightly attached to the conducting plate on the positioning PCB, and the conducting plate is connected to one or plural PCB conductive contact sheets.

* * * * *